Sept. 19, 1939. W. H. CHURCHILL 2,173,198
SELF-PIERCING FASTENER MEMBER
Original Filed Oct. 24, 1936
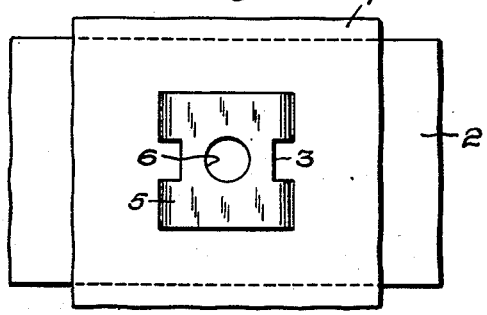
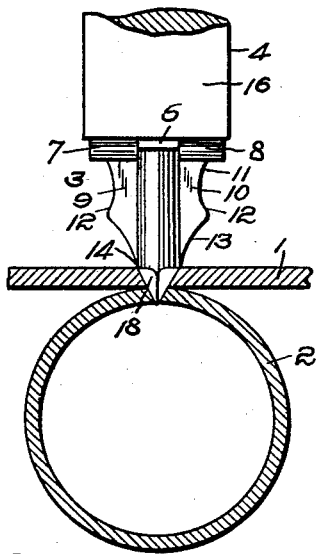
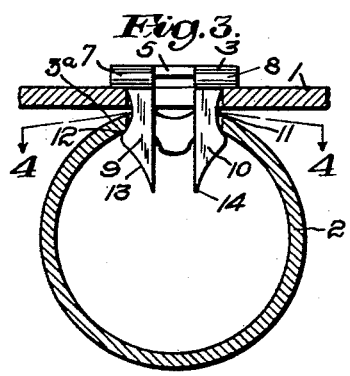
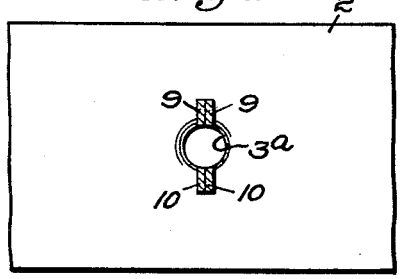
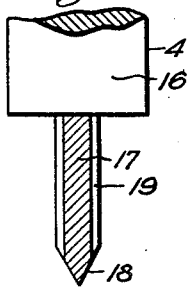
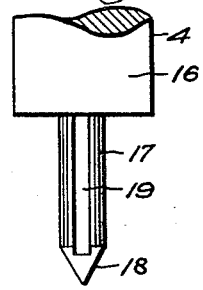
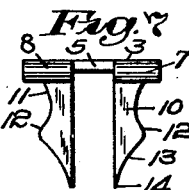
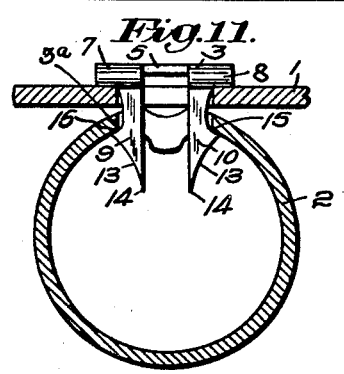
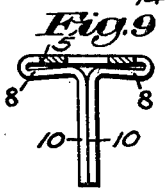
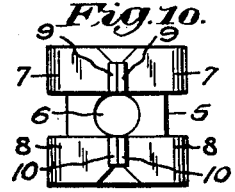
INVENTOR
Wilmer H. Churchill.
By Walter P. Jones ATTORNEY Patented Sept. 19, 1939

2,173,198

UNITED STATES PATENT OFFICE 2,173,198

SELF-PIERCING FASTENER MEMBER

Wilmer H. Churchill, Saugus, Mass., assignor to United-Carr Fastener Corporation, Cambridge, Mass., a corporation of Massachusetts Original application October 24, 1936, Serial No. 107,415, now Patent No. 2,133,916, dated October 18, 1938. Divided and this application May 14, 1938, Serial No. 208,040

2 Claims. (Cl. 85—5)

My invention relates to improvements in self-piercing fastener members for use in fastening two or more pieces of material together.

Reference is hereby made to my application U. S. Patent No. 2,133,916 issued October 18, 1938, which contains claims to the method of fastening pieces of material together by the use of my improved self-piercing fastener member and of which this application is a division.

In the drawing, which illustrates a preferred form of my invention:

Figure 1 is a plan view showing a strip of material secured to a supporting part, such as a piece of metal tubing, by means of my improved fastener member;

Fig. 2 is a section showing the sheet material and metal tubing in superposed relation and a punch, shown in elevation carrying a fastener member, in the act of piercing the superposed parts;

Fig. 3 is a view similar to that of Fig. 2 showing the strip of material and metal tubing in final attachment by means of my improved fastener member;

Fig. 4 is a section taken along the line 4—4 of Fig. 3;

Fig. 5 is a sectional view of the punch shown in Fig. 2;

Fig. 6 is a plan view of the punch shown in Fig. 2 with the punch turned 90°;

Fig. 7 is a front view of my improved fastener member per se;

Fig. 8 is a side view of the fastener member shown in Fig. 7;

Fig. 9 is a sectional view of the fastener member shown in Fig. 8;

Fig. 10 is a bottom plan view of the fastener member shown in Figs. 7 and 9; and Fig. 11 is a view similar to that of Fig. 3 showing a modified form of fastener member.

In my preferred form of installation, as illustrated in Figs. 1 and 3, I have shown a strip 1 preferably formed of carboard or similar material secured to a supporting piece 2, which may be a metal tubing or other metal piece as shown in the figures, by means of my improved fastener member 3. The tubing 2 may be used in the framework of an automobile seat and the strip 1 a part of an upholstery panel secured to the tubing 2 for trimming or decorating purposes. Although I have chosen the strip 1 and tubing 2 for the purpose of illustrating my invention, it is understood that I do not wish to be limited by the same because other materials could be fastened together through the method hereinafter described. A punch 4 (Fig. 2), which may be attached to any suitable machine (not shown), is adapted to come down upon the superposed parts 1 and 2 and pierce the same. The fastener 3, preferably in initial assembly with the punch 4, is provided with spaced pairs of spring arms having shoulder means constructed to pass through the materials of parts 1 and 2 during downward movement of the punch. The shoulder means are adapted to contract during passage through the parts 1 and 2 and then spring outwardly to engage the material of the tubing 2 adjacent the aperture 3ª formed in the same during the piercing process with the result that the parts 1 and 2 are held between the shoulders and the base of the fastener, as most clearly shown in Fig. 3.

Referring in more detail to the fastener member used in my improved method, I have illustrated in Figs. 7-10 a preferred construction of my fastener having a base 5, which may be of square or rectangular shape, provided with an aperture 6 substantially in the center thereof. The base 5 has pairs of inwardly-bent portions 7—7 and 8—8 at opposite ends of the base with the portions of each pair extending from opposite edges thereof toward the center so that the inner ends of each pair are in opposed relationship (Fig. 10). Outwardly-extending arms 9—9 project from the inner ends of the portions 7—7 and outwardly-extending arms 10—10 project from the inner ends of the portions 8—8. The pairs of arms 9—9 and 10—10 are spaced laterally one from another. The portions 7—7 and 8—8 are preferably spaced from the base portion 5 so that they may have a twisting or torsional action when the pairs of projecting arms 9—9 and 10—10 are moved inwardly toward one another during contraction of the arms.

Each of the pairs of outwardly-extending arms 9—9 and 10—10 have opposed inner surfaces in substantially adjacent relation one to another, as most clearly illustrated in Figs. 8-10. Also, the pairs of arms 9—9 and 10—10 are preferably in direct alignment one with another and adapted to move inwardly toward each other. The outer edges of the arms 9—9 and 10—10 are shaped to provide a neck 11 which may be of any desired length, a relatively rounded shoulder portion 12 and a tapering camming surface 13 located on the opposite side of the shoulder 12 from the neck 11. The camming surface 13, in my preferred form, tapers to a relatively sharp point 14 at its free end, as most clearly shown in Fig. 7. It will be noticed that the outer edges of the pairs of arms 9—9 and 10—10 lie in even relationship as shown in Figs. 7 and 10. Although I have described my preferred form of fastener member as having spaced pairs of projecting arms with the arms of each pair in side-by-side relation, I do not wish to be limited to that particular construction because a satisfactory, if less strong, fastener member has been provided in which inwardly-bent portions extend from one edge only of the base 5 so that single projecting arms only are arranged in spaced aligned relation for a scissors-like action.

The modified form of my fastener invention illustrated in Fig. 11 differs from the preferred form of fastener member shown in Figs. 7–10 by reason of the fact that relatively sharp shoulders 15—15 are substituted for the less abrupt shoulders 12—12 of my preferred form. The sharp shoulders 15—15 are more difficult to free from the part with which they are engaged than the more rounded shoulders and hence are more useful in certain installations, particularly in installations having parts not intended to be separated after they have once been secured together.

The punch 4, as most clearly illustrated in Figs. 2, 5 and 6, has a body portion 16 and a relatively slender piercing pin 17 at one end terminating, in my preferred form, in a four-sided taper 18. Slots 19 are longitudinally disposed along opposite sides of the pin 17 (Figs. 5 and 6) having a width greater than the thickness of each pair of adjacent arms 9—9 and 10—10 and a depth substantially equal, in my preferred form, to the length of that portion of the shoulders overlying the inner surface of the tubing 2 when the shoulders are in final engagement with the same. The slots 19 in my preferred form extend slightly into the faces of the taper 18, as most clearly shown in Fig. 6.

In operating my device to secure the imperforate strip 1 to the imperforate tubing 2, the strip may be placed in superposed relation with the tubing 2 with its inner face adjacent the material of the tubing as shown in Fig. 2. The fastener member 3 is then assembled with the punch 4 by aligning the pin 17 with the aperture 6 and then slipping the base 5 over the pin 17 until the base lies substantially adjacent the body portion 11. Some form of registering means (not shown) may be provided as a part of the body portion 16 of the punch for the purpose of quick and accurate registering of the fastener base with the tool base. The fastener member is held in temporary fixed position with the tool in my preferred form through friction between parts of the fastener and the pin 17. When the fastener is in complete assembly with the tool, the pairs of arms 9—9 and 10—10 align with respective slots 9—9 and 10—10 spaced slightly from the bottom surface of the respective slots 19.

As the punch is brought down upon the superposed parts 1 and 2, the taper 18 at the free end of the pin 17 penetrates the parts 1 and 2 as shown in Fig. 2. As the taper 18 continues through the parts, the camming surfaces 13 of the fastener arms engage the material adjacent the apertures formed by the piercing action of the taper 18 and cut through the material thereby enabling the shoulders 12 to pass entirely through the parts. As the camming surfaces 13 engage the material of the parts 1 and 2, the arms 9—9 and 10—10 are forced inwardly into the slots 19, in which position they are held until the shoulders 12 have passed through the parts, at which time the torsion set up in the inwardly-bent portions 7—7 and 8—8 causes the shoulders to spring outwardly for engagement with the material of the part 2 adjacent the aperture 3ᵃ (Figs. 3 and 11). As the shoulders 12 spring outwardly into engaging position, the punch 4 moves upwardly into normal position enabling another fastener to be assembled with the same for repeating the fastening action. The parts 1 and 2 are now firmly held between the shoulders 12 and the base 5 of the fastener member.

Any number of fasteners may be applied to the parts for holding the same together and it is important to note that with my preferred installation the fasteners have greater holding powers if applied with the arms placed at right angles to the length of the tube. It is also possible by my device to fasten articles having greater thicknesses than those illustrated in the preferred form of my invention by increasing the length of the piercing pin and providing a fastener member having a greater relative distance between the shoulders of the arms and the base. In production assembly a form of automatic feed (not shown) might be utilized so that the pin 17 would pick up each fastener member during downward movement of the punch for carrying the fastener through the parts to be secured together. Further, it might be necessary to equip the punch press with strippers (not shown) to pull the fastener off the punch after attachment.

As a result of my invention I have provided an easily operated means for securing pieces of material together, which are imperforate before they are subjected to action of the piercing pin, by use of a strong and durable fastening means which is of comparatively simple and inexpensive construction.

Although I have illustrated a preferred form of my invention, I do not wish to be limited thereby because the scope of my invention is best set forth in the following claims.

I claim:

1. A metal-piercing snap fastener member for securing pieces together at least one of which is metal, said fastener member having a base portion, arms opposed to each other edgewisely and extending from and located beneath said base and having outer shouldered edges shaped for holding the arms against accidental withdrawal from said pieces, and said arms having inner edges spaced from each other throughout their entire lengths whereby a tool may be inserted between said arms during initial insertion of said fastener through said pieces, and said base having an aperture in line with said spaced edges to permit passage of said tool.

2. A snap fastener member of the class described comprising a base having four separate folded-under portions extending beneath the base in substantially parallel relation thereto, and a flat arm extending from the inner end of each of said folded-under portions and being arranged in side-by-side pairs with the edges of one pair being substantially opposite and spaced from the corresponding edges of the other pair for relative movement toward and away from each other and each of said arms being shaped for snap fastener engagement with a cooperating member.

WILMER H. CHURCHILL.